Aug. 25, 1959 C. C. HALBERSTADT 2,901,126
WORK HANDLING APPARATUS WITH CONTROLLED GRIP MECHANICAL HAND
Filed Dec. 7, 1956 4 Sheets-Sheet 2
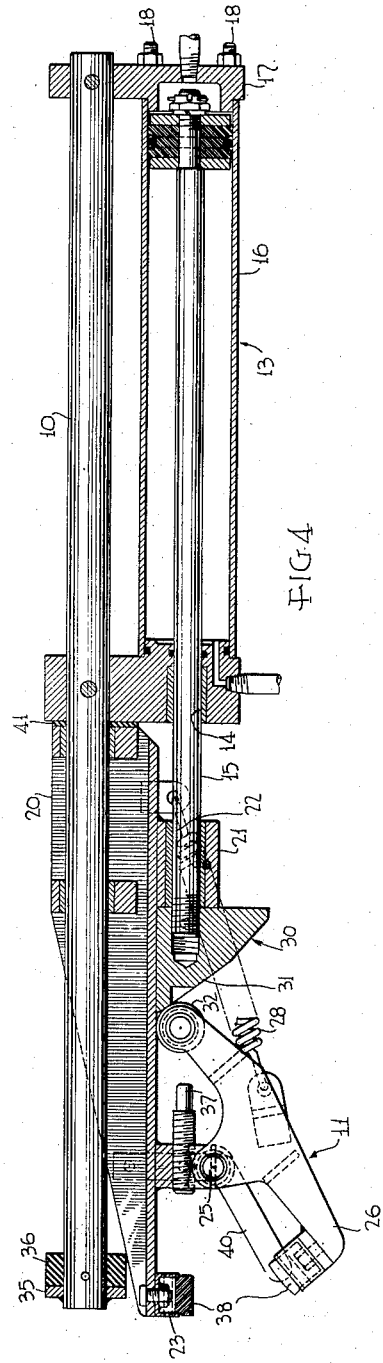
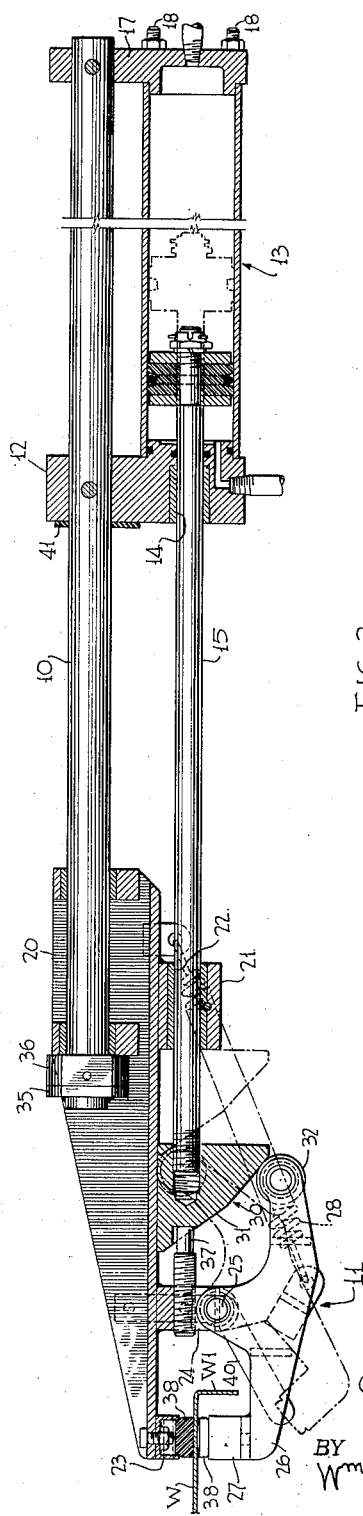
INVENTOR
Charles C. Halberstadt
BY Wm. R. Glisson
ATTORNEY Aug. 25, 1959 C. C. HALBERSTADT 2,901,126
WORK HANDLING APPARATUS WITH CONTROLLED GRIP MECHANICAL HAND
Filed Dec. 7, 1956 4 Sheets-Sheet 3
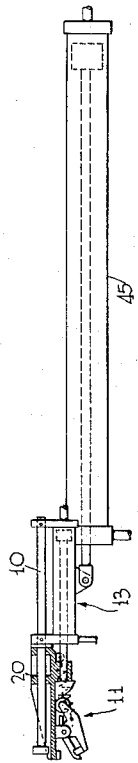
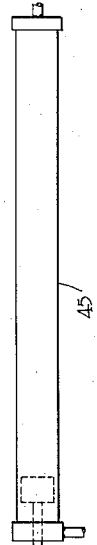
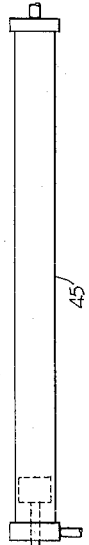
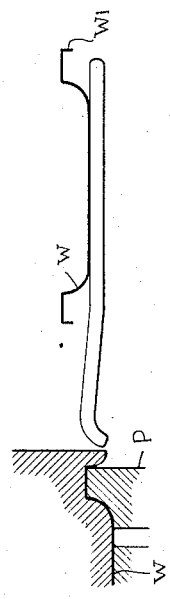
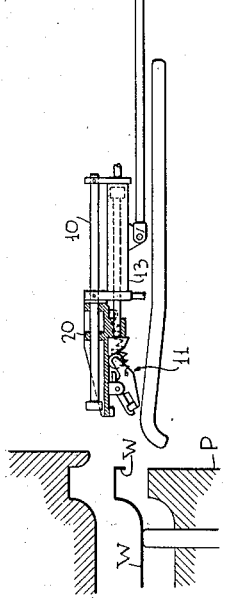
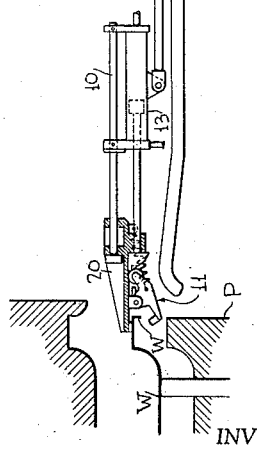
FIG.5  FIG.6  FIG.7
INVENTOR
Charles C. Halberstadt
BY
Wm. R. Glisson
ATTORNEY

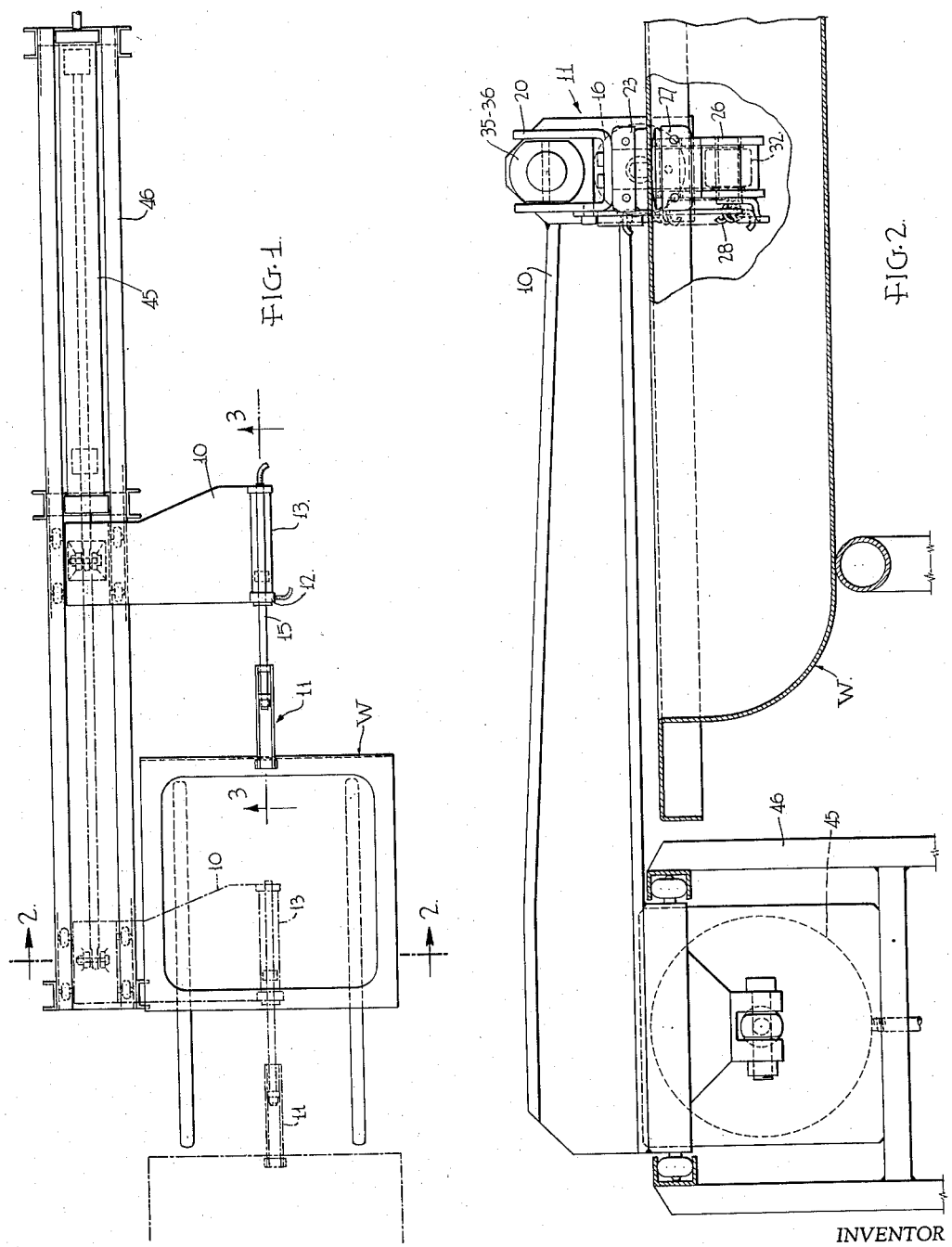

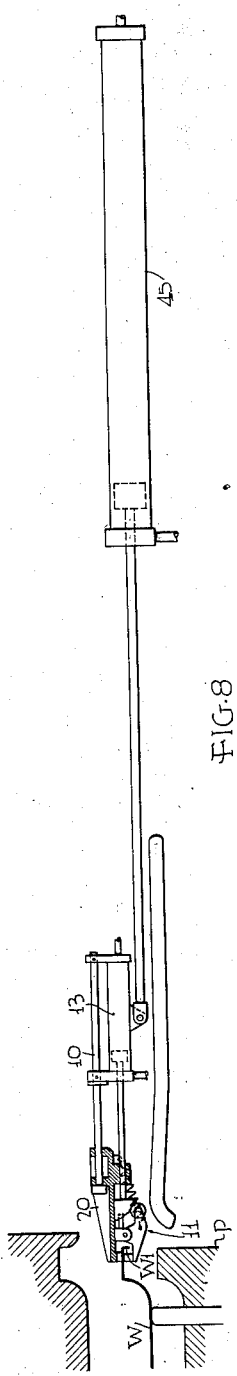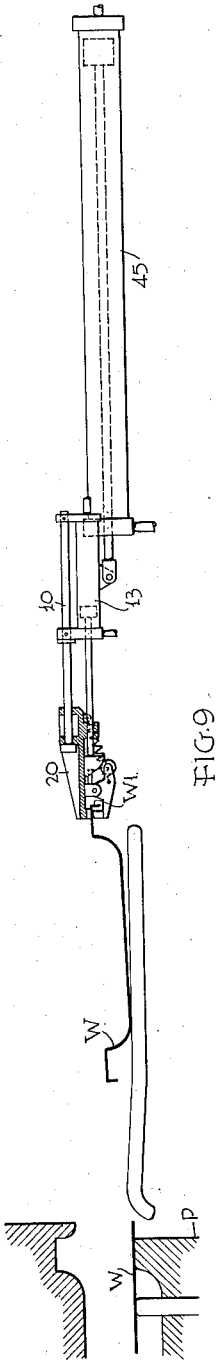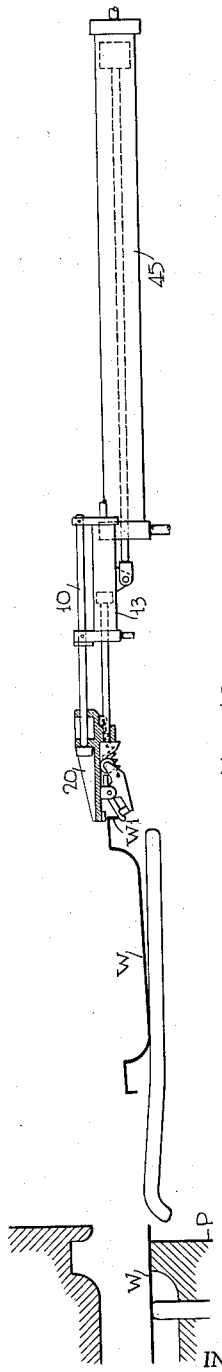

United States Patent Office 2,901,126
Patented Aug. 25, 1959

2,901,126

WORK HANDLING APPARATUS WITH CONTROLLED GRIP MECHANICAL HAND

Charles C. Halberstadt, Gladwynne, Pa., assignor to The Budd Company, Philadelphia, Pa., a corporation of Pennsylvania Application December 7, 1956, Serial No. 626,855

2 Claims. (Cl. 214—1)

This invention relates to work handling apparatus with a controlled grip mechanical hand, as for serving sheet forming presses and the like, the hand changing its position relative to its engagement with a workpiece while the hand is in a halted position at the workpiece, and has for an object the provision of improvements in this art.

Heretofore hands or grippers have been provided for removing stampings from presses but so far as known these hands gripped the workpiece while there was forward motion, the movable finger or jaw being closed, for example, by the engagement with a camming element in passing, see Patent 2,275,561 and others; but evidently smooth-edged workpieces were the only ones dealt with because the gripping action while the hand was travelling was not suited for grasping flanged workpieces.

One of the particular objects of the invention is to provide a gripping hand which closes upon a workpiece after the hand has halted, thus enabling the fingers or jaws of the hand to engage behind a transverse lateral flange and avoiding bending the flange or marring the workpiece.

Another object is to provide a mechanical hand which is both moved into position for gripping a workpiece and thereafter moved to closing position upon the workpiece by a single power device whereby to insure that the fingers are in proper longitudinal position before they grip the workpiece and also to insure that the fingers have fully released the workpiece before the action to pull them clear of the workpiece has begun.

The above and other objects of the invention as well as various advantages and features of novelty will be apparent from the following description of an exemplary embodiment, reference being made to the accompanying drawings thereof, wherein:

Fig. 1 is a plan view of apparatus embodying the invention;

Fig. 2 is an enlarged elevation and section taken on the line 2—2 of Fig. 1;

Fig. 3 is an enlarged vertical sectional view of the gripper device alone, the section being taken on the line 3—3 of Fig. 1;

Fig. 4 is a section like Fig. 3 but showing the gripper in retracted position; and Figs. 5 to 10 are diagrams in vertical elevation and section to show the action of the mechanism.

The apparatus shown in the drawings comprises a press P which forms a sheet metal stamping or workpiece W having a forward transverse lateral flange W1 in the edge which is to be gripped by the handling mechanism which is the subject of the present invention.

The handling mechanism includes a support 10 which is mounted for bodily to-and-fro movement longitudinally toward and from the press by means of any desired character, as will be described later.

The support chiefly comprises a rod or tube which serves as a guide for hand mechanism generally referred to by the numeral 11. The rod has rigidly secured to it intermediate its length a support guide member 12 which carries a power device 13 and which provides a guide bore 14 for a reciprocating rod 15 (a piston rod) of the power device. A cylinder 16 of the power device is secured to the support guide member 12 and has its head 17 secured to the support 10 and held on the cylinder by clamp rods 18.

A slide 20, which comprises part of the hand mechanism is mounted for longitudinal reciprocating movement on the support rod 10 and includes a depending projection 21 which is provided with a lined guide bore 22 for the piston rod 15.

At its forward end the slide 20 carries a first gripping finger or jaw 23 and therebehind is provided with a downward projection 24 carrying a pivot pin 25 on which is mounted a jaw lever 26 carrying a second finger or jaw proper 27. The jaw is raised above the lever sufficiently to allow the workpiece flange to be received behind it. The jaw lever is urged in a direction to hold the jaw open by resilient means such as a tension coil spring 28.

Means are provided for first moving the jaw 23 forward into a fixed longitudinal position relative to the workpiece and thereafter closing the fingers or jaws on the workpiece behind the flange. The means herein provided for this purpose comprise a cam block 30 of wedge shape which is secured to the front end of the piston rod 15 and which is guided along the lower surface of the slide 20. The cam block has a cam face 31 which engages a cam follower roller 32 carried by the tail end of the jaw lever 26.

When the piston rod moves forward it first moves the entire slide forward because the spring 28 holds the finger arm against turning by the cam 31. After the slide moves the required distance to put the fingers or jaws in proper position behind the workpiece flange the slide engages a stop 35 carried by the front end of the support rod 10, a slightly resilient sleeve 36, as of "Fabreeka," being interposed to ease the blow of stopping.

After the slide stops, the piston rod, by further movement, forces the cam to ride under the cam follower roller and move the second finger or jaw toward the first to grip the stock between them. An adjustable stop 37 carried by the depending projection 24 limits the forward motion of the cam block and thereby limits the gripping force on the jaws. With moderately soft neoprene finger tips 38 this provides firm engagement without marring the workpiece.

A stripper finger 40 is secured to the side of the depending projection in a position to stand above the top of the lower jaw 27 when it is open so that the flange is held above the jaw where it will slide off the stripper finger as the slide moves back. It will be seen that the hand maintains its grip on the workpiece as the main support is moved back but when the piston of the hand operating power device is moved back it first allows the jaws to open and release the workpiece due to the action of the coil spring to open the lower jaw, and thereafter pulls the slide back. The slide stops against a resilient sleeve 41, as of "Fabreeka" in front of the support guide member 12.

The diagrams, Figs. 5–10, show the action of the mechanism.

In Fig. 5 one workpiece has been pulled out of the press and is ready for removal from the supporting table and another workpiece has been formed in the press. The gripper pull-out mechanism is in its rearward rest position where it has been carried by the travel-producing mechanism which is shown for simplicity as a long cylinder-piston device 45 mounted on a stand 46. This long-travel power device could be a swinging arm carried by the press or other known types of mechanisms. The pull-out table also is merely representative of many possible forms of supports in transition for the workpiece.

In Fig. 6 the press has opened and the workpiece has been pushed up by the ejector mechanism ready for removal. The pull-out mechanism has been moved forward by the long-travel power device 46.

In Fig. 7 the gripper jaws have been moved forward to gripping position and will have no further forward movement relative to the workpiece.

In Fig. 8 the jaws have been closed on the workpiece.

In Fig. 9 the long-stroke mechanism has pulled the entire gripper device outward while the workpiece is still securely held in the gripper jaws.

In Fig. 10 the gripper jaw operating cam has moved back allowing the jaws to open. The flange of the workpiece rides off on the stripper finger 40 free of the lower jaw.

The full return position of the jaws with their slide is shown in Fig. 4. Fig. 3 corresponds to the Fig. 8 position.

It is thus seen that the invention provides a simple reliable mechanism for removing workpieces with flanges without marring them.

While one embodiment of the invention has been disclosed for purposes of illustration it is to be understood that there may be various embodiments and modifications within the general scope of the invention.

What is claimed is:

1. Work handling apparatus including mechanical hand mechanism adapted to be traversed for serving a workpiece, comprising in combination, a movable support, and gripping hand mechanism mounted for to-and-fro traversing movement on said support, said gripping hand mechanism including a slide and two relatively movable jaws carried thereby for engaging a workpiece, a stop on said support for limiting the forward position of said slide, a power device carried by said support for both traversing said slide and actuating said jaws to engage a workpiece, one of said jaws being rigidly secured on said slide and the other being pivotally mounted on the slide for movement toward and from the rigidly-secured jaw, said pivoted jaw having an operating arm with a cam follower, a spring biasing said pivoted jaw toward open position, a push rod operated by said power device, a wedge cam carried by said rod engaging the cam follower of said pivoted jaw arm, and an adjustable stop on said slide for limiting the forward movement of said push rod and cam, the cam first acting against said cam follower and the tension of the spring to force said slide and rigidly-secured jaw to a fixed position against said stop and then acting further to close the pivoted jaw toward the rigidly-secured jaw to grip a workpiece between them.

2. Work handling apparatus including mechanical hand mechanism adapted to be traversed for serving a workpiece, comprising in combination, a movable support, and gripping hand mechanism mounted for to-and-fro traversing movement on said support, said gripping hand mechanism including a slide and two relatively movable jaws carried thereby for engaging a workpiece, a stop on said support for limiting the forward position of said slide, a power device carried by said support for both traversing said slide and actuating said jaws to engage a workpiece, one of said jaws being rigidly secured on said slide and the other being pivotally mounted on the slide for movement toward and from the rigidly-secured jaw, said pivoted jaw having an operating arm with a cam follower, a spring biasing said pivoted jaw toward open position, a push rod operated by said power device, a wedge cam carried by said rod engaging the cam follower of said pivoted jaw arm, the cam first acting against said cam follower and the tension of the spring to force said slide and rigidly-secured jaw to a fixed position against said stop and then acting further to close the pivoted jaw toward the rigidly-secured jaw to grip a workpiece between them, and a fixed stripper finger carried by said slide and extending outward from the pivot axis of said pivoted jaw, said finger having a straight slide surface disposed within the outer position of the pivoted jaw for causing the workpiece to be released from the jaw.

References Cited in the file of this patent

UNITED STATES PATENTS

| | | |
|---|---|---|
| 1,526,517 | Voght | Feb. 17, 1925 |
| 2,352,632 | Heyman | July 4, 1944 |
| 2,381,657 | Eksergian et al. | Aug. 7, 1945 |
| 2,490,558 | Sullivan | Dec. 6, 1949 |
| 2,572,991 | De Grand | Oct. 30, 1951 |
| 2,679,430 | Byron | May 25, 1954 |
| 2,755,759 | Roberts | July 24, 1956 |
| 2,763,229 | Sahlin | Sept. 18, 1956 |
| 2,781,136 | Sehn et al. | Feb. 12, 1957 |
| 2,828,998 | Seelye | Apr. 1, 1958 |

FOREIGN PATENTS

| | | |
|---|---|---|
| 161,653 | Great Britain | Apr. 11, 1921 |